United States Patent [19]
Fletcher et al.

[11] 4,044,821
[45] Aug. 30, 1977

[54] LOW TO HIGH TEMPERATURE ENERGY CONVERSION SYSTEM

[76] Inventors: James C. Fletcher, Administrator of the National Aeronautics and Space Administration, with respect to an invention of Charles G. Miller, Pasadena, Calif.

[21] Appl. No.: 536,786

[22] Filed: Dec. 27, 1974

[51] Int. Cl.² .............................................. F25B 13/00
[52] U.S. Cl. ................................. 165/2; 62/4; 126/263; 165/107
[58] Field of Search ............ 126/263, 400; 62/467 R, 62/4; 165/2, 107, DIG. 17

[56] References Cited

U.S. PATENT DOCUMENTS

| | | | |
|---|---|---|---|
| 3,075,361 | 1/1963 | Lindberg | 62/4 |
| 3,893,299 | 7/1975 | Hutchinson | 165/45 X |
| 3,958,625 | 5/1976 | Wentorf, Jr. | 165/107 |

OTHER PUBLICATIONS

McKisson, RL *Dissociation-Cooling,* Livermore Research Lab., Livermore, Cal., (AEC) LRL-86, 20 pgs..

*Primary Examiner*—Leland A. Sebastian
*Attorney, Agent, or Firm*—Monte F. Mott; Wilfred Grifka; John R. Manning

[57] ABSTRACT

One embodiment of a low to high temperature energy conversion system includes a decomposition chamber in which ammonia ($NH_3$) is decomposed into hydrogen and nitrogen by absorbing heat of decomposition from a low temperature, e.g., 300° C energy source. The separated hydrogen and nitrogen are then supplied to a recombination chamber wherein they recombine to produce ammonia. The recombination process is associated with a significant increase in temperature, used to increase the temperature of a fluid to temperatures on the order of 500° C.

6 Claims, 6 Drawing Figures

| TEMP. °C | PRESSURE (ATMOS. ABS.) | | | | | | |
|---|---|---|---|---|---|---|---|
| | 10 | 30 | 50 | 100 | 300 | 600 | 1000 |
| 200 | 50.66 | 67.56 | 74.38 | 81.54 | 89.94 | 95.37 | 98.29 |
| 250 | 28.34 | 47.22 | 56.33 | 67.24 | 81.38 | 90.66 | 96.17 |
| 300 | 14.73 | 30.25 | 39.41 | 52.04 | 70.96 | 84.21 | 92.55 |
| 350 | 7.41 | 17.78 | 25.23 | 37.35 | 59.12 | 75.62 | 87.46 |
| 400 | 3.85 | 10.15 | 15.27 | 25.12 | 47.00 | 65.20 | 79.82 |
| 450 | 2.11 | 5.86 | 9.15 | 16.43 | 35.82 | 53.71 | 69.69 |
| 500 | 1.21 | 3.49 | 5.56 | 10.61 | 26.44 | 42.15 | 57.47 |
| 550 | 0.76 | 2.18 | 3.45 | 6.82 | 19.13 | 31.63 | 41.16 |
| 600 | 0.49 | 1.39 | 2.26 | 4.52 | 13.77 | 23.10 | 31.43 |
| 650 | 0.33 | 0.96 | 1.53 | 3.11 | 9.92 | 16.02 | 20.70 |
| 700 | 0.23 | 0.68 | 1.05 | 2.18 | 7.28 | 12.60 | 12.87 |

LOW TO HIGH TEMPERATURE ENERGY CONVERSION SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention relates to temperature conversion and, more particularly, to a system for producing high temperatures from sources of relatively low temperature energy sources.

2. Description of the Prior Art

There are many processes which require high temperatures for their efficient operation. For example, for a large number of chemical reactions there is a practical lower limit of temperature, below which a desired reaction will not proceed, or below which it proceeds too slowly to be of technical value. In another example, the efficiency of the process by which electrical power is generated by turbines, driven by vapor, is critically dependent on the vapor temperature. Higher vapor temperatures produce more electrical power output from the same energy content, and permit smaller equipment, at a lower capital investment to be used, compared to those required to generate the same power using lower temperature vapor. Modern turbine-driven electrical generators operate at an input temperature of about 550° C, using super-heated steam. While there are many potential sources of energy which can be used to heat a fluid to produce vapor, most of the economical sources do not provide sufficiently concentrated energy to vaporize a continuously flowing fluid to the desired high temperatures, assumed to be on the order of 500° C or higher.

For example, while solar energy concentrators of the tracking type are capable of producing vapor at sufficiently high temperatures, such concentrators are very expensive because of the need for tracking mechanisms of substantial accuracy and the need for large and precise energy concentrators, such as parabolic reflectors with associated optics, in order to project a very small concentrated sun image on the collector targets. To date, the less demanding and less costly non-tracking type solar energy concentrators are only capable of producing steam at lower temperatures on the order of 300° C. Geothermal energy can also be used to produce steam or vapor in about the same temperature range of 300° C. Such temperatures are too low for efficient vapor turbine electrical energy generation.

Thus, a need exists for a system and process to recover heat energy from low temperature heat sources and to convert the recovered energy to higher temperatures.

OBJECTS AND SUMMARY OF THE INVENTION

It is a primary object of the present invention to provide a system and method for converting at least some heat energy from low temperature heat sources to higher temperatures.

Another object of the present invention is to provide a system and method for recovering heat energy from low temperature heat sources, such as solar collectors or geothermal sources, and converting it to high temperatures on the order of 500° C or more.

A further object of the present invention is to provide a sytem and process for the conversion of low temperatures from low temperature heat sources to higher temperatures for the efficient operation of compact or low capital investment turbine-driven electrical generators, or in other applications, to enable chemical reactions that have a critical lower temperature limit, which is itself higher than the temperature of the primary low temperature source, to be used.

Theses and other objects of the invention are achieved by a system and process in which a working substance such as a chemical compound is decomposed into simpler substances at relatively low temperature and low pressure. The low temperature heat which is absorbed is effectively stored in the form of chemical potential in the simpler substances. The simpler substances are subsequently recombined into the original compound, generally at higher pressure. During the recombination heat of recombination is released which raises the environment in which the recombination takes place to a substantially higher temperature. A substantial portion of the released heat of recombination is extracted to perform useful work, such as for example, produce vapor at high temperatures for driving a turbine in a electrical generator. The working substance is then led back to be decomposed by the absorption of low temperature heat and the process is repeated. The system can be thought of as a temperature coverter, or low-to-high temperature energy conversion system.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2:
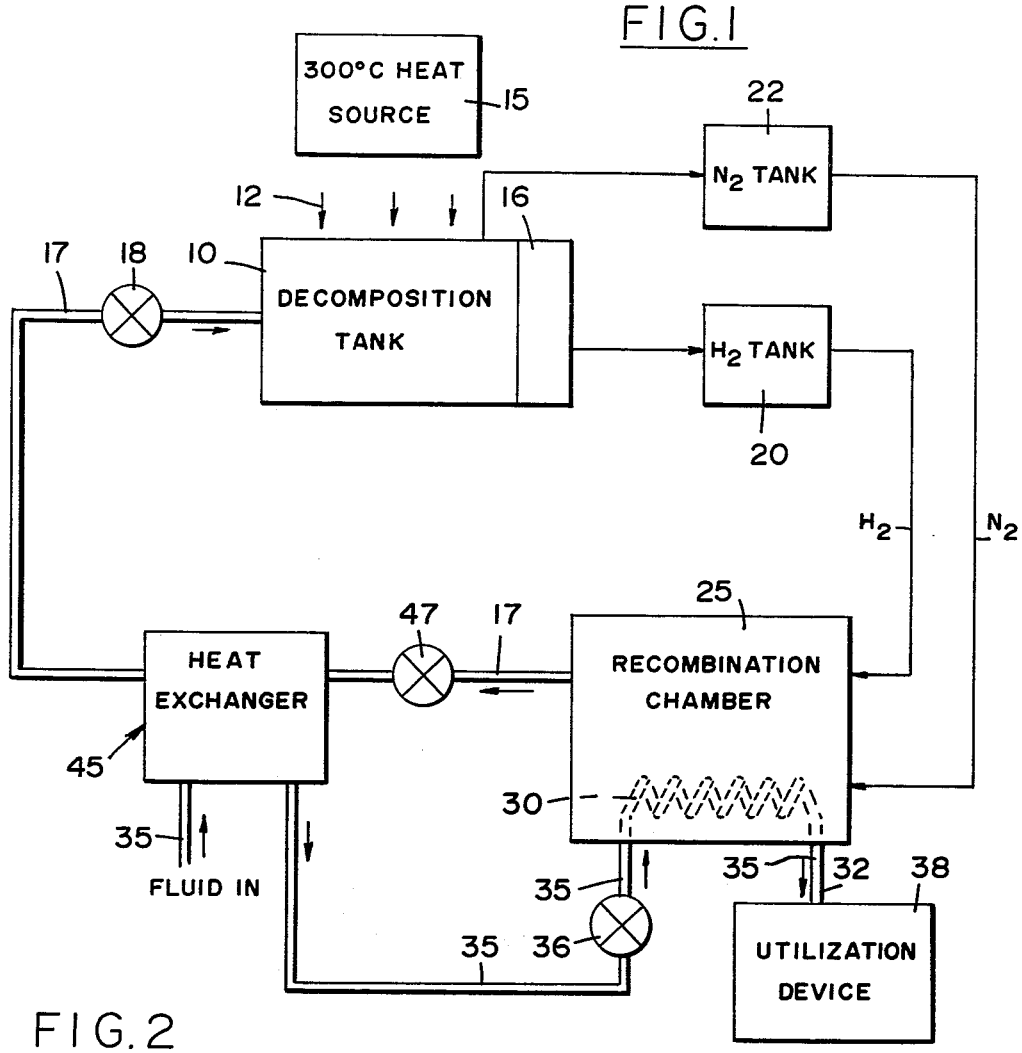
FIG. 1 is a diagram of an embodiment of the invention using a gas as the working substance.
FIGS. 2 and 3 are a table and graph respectively, related to the equilibrium percentages of $NH_3$ at different temperatures and pressures.

The present invention makes use of complex chemical compounds, hereinafter also referred to as the working substances, which upon absorption of heat from a relatively low temperature source are decomposable into their constituents or into simple chemical substances. Such constituents can subsequently be recombined to form the original complex chemical compounds. During recombination, heat of recombination is released, raising significantly the temperature of the chamber in which the recombination takes place. The high temperature in the recombination chamber is used to heat a transport fluid or material to a relatively high temperature, approaching the recombination chamber temperature, which is appreciably higher than the temperature of the primary heat source which serves to decompose the working substance.

Finally, the recombined working substance is lead from the recombination chamber, its residual thermal energy utilized in an appropriate expansion engine, and the now-cool recombined working substance led to the decomposition chamber. The primary (low temperature) heat source causes decomposition and the cycle is repeated.

Before proceeding to describe specific embodiments of the invention, the types of working substance, which can be used and the manner of their decomposition, will be discussed.

Useful working substances for the present invention are those in which input shifts the equilibrium toward the decomposition of the substances into their constituents. Such decomposition may or may not involve the use of catalysts to hasten the equilibrium shift. If the decomposition products, i.e., the constituents, can be separated from the undecomposed working substance, such separation or removal promotes further shift of equilibrium toward further decomposition. If one of the decomposition products (constituents) can be physically removed from the decomposition zone, the complex chemical compound can be completely decomposed into its constituents, and a maximum amount of heat at the decomposition temperature will be absorbed by the system to effect the decomposition.

It is relatively easy to accomplish such separation if the original chemical compound is a solid, and one of its constituents is a gas, as in metal hydrides. One example is the decomposition of magnesium hydride, represented by the equation, $$MgH_2 (Solid) \rightarrow Mg(Solid) + H_2 (gas) \uparrow$$

The decomposition goes to completion if the separated hydrogen gas is merely allowed to flow away from the reaction, in which case only the Mg solid remains.

If, however, one starts with a gaseous working substance, where the decomposed constituents are also gases, gas separation is needed for complete decomposition. Otherwise, we get only partial decomposition and a shift in the equilibrium amounts until the decomposed percentages are in accord with temperature equilibrium. This reaction in connection with $NH_3$ as the working substance may be represented by the equation, $$2NH_3 (gas) \rightleftharpoons N_2 (gas) + 3H_2 (gas).$$

In order for this decomposition to proceed toward the right to a large extent, it is necessary to remove at least one of the gaseous products, $N_2$ (gas) or $H_2$ (gas) from the reaction zone where all three gases (including $NH_3$) are present. Such a separation can be done by methods to be described in connection with the present disclosure.

Alternately, one can start with a working substance which is a liquid, such as cyclohexane, which can be decomposed by the absorption of relatively low-temperature heat, according to the reaction $$C_6H_{12} (liquid) \rightleftharpoons C_6H_6 (gas) + 3H_2 (gas).$$

Again, if one of the products, say $C_6H_6$, is separated from the mixture of the three species, present in the reaction zone, the decomposition of the complex compound cyclohexane, using low temperature heat input, can proceed to completion. Thus, the decomposable complex chemical compound for use in the present invention may be a solid, a liquid or a gas. Several examples of working substance of the types which can be used in the present invention are given herein:

$$2NH_3 (gas) \rightleftharpoons N_2(gas) + 3H_2(gas)$$

$$2SO_3(gas) \rightleftharpoons 2SO_2(gas) + O_2(gas)$$

$$C_6H_{12}(liquid) \rightleftharpoons C_6H_6(gas) + 3H_2(gas)$$

$$C_7H_{14}(liquid) \rightleftharpoons C_7H_8(gas) + 3H_2(gas)$$

$$2BaO_2(solid) \rightleftharpoons 2BaO(solid) + O_2 (gas)$$

$$MgH_2(solid) \rightleftharpoons Mg(solid) + H_2(gas)$$

$$C_{10}H_{18}(solid) \rightleftharpoons C_{10}H_8(solid) + 5H_2(gas)$$

Appropriate separation methods, for the removal of one of the constituents of the decomposed working substance have to be chosen individually to the best advantage of the chemical nature of the reactions. In general, for gas-gas separation, diffusion membranes, such as Pd for $H_2$ or Ag for $O_2$ are best suited, but a molecular skim may be better suited to produce other gas-gas separations. For the liquid-gas separation molecular sieves may be used, while for the solid-gas separation the phase separation is inherently complete.

Figure 3:
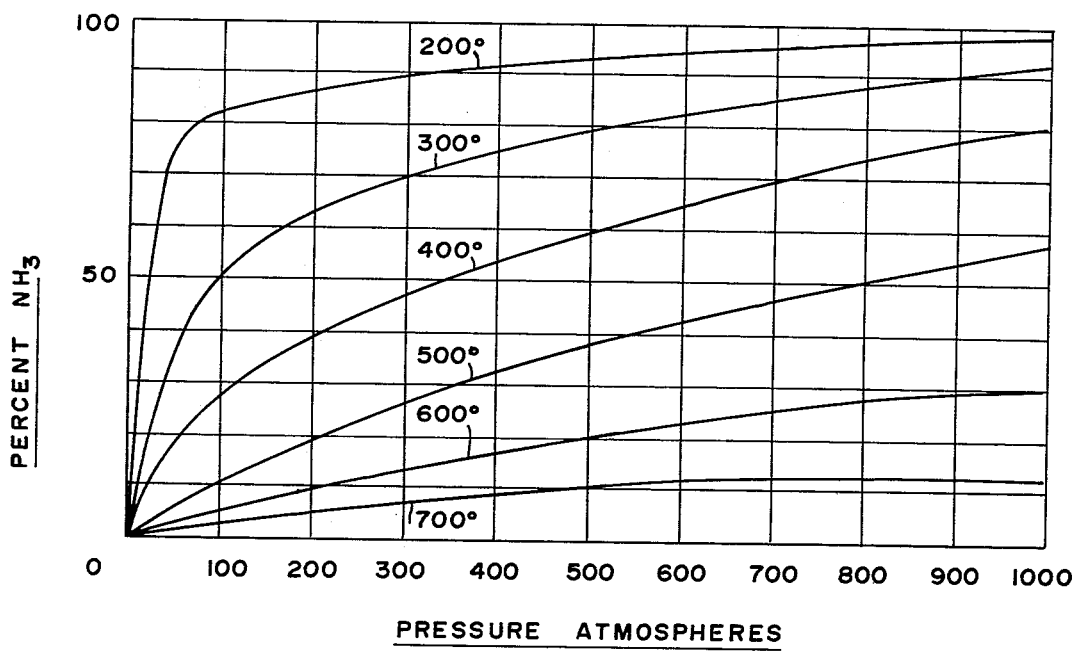

As an example, the utilization of a particular working substance, ammonia ($NH_3$) gas, will be described, although it should be realized that a similar description can be made for any one of a great number of other possible working materials. In FIG. 1, numeral 10 designates a tank in which a quantity of $NH_3$ is present. As is known, when $NH_3$ is maintained in a closed vessel or an elevated temperature, the $NH_3$ is typically present as a mixture with some free hydrogen ($H_2$) and with some free nitrogen ($N_2$) present. The percentage of $NH_3$ in the mixture at equilibrium depends on the mixture temperature and pressure. FIGS. 2 and 3 represent in table and graph forms the percentage of $NH_3$ in equilibrium as a function of pressure and temperature. For explanatory purposes, let it be assumed that the temperature in tank 10 is on the order of 300° C.

Arrows 12 represent thermal energy or heat provided by a low temperature heat source 15, such as a solar collector or a source of geothermal energy. Generally, such sources are capable of delivering heat at temperatures on the order of 300° C. Thus, source 15 is assumed to provide heat at 300° C so as to maintain the tank at 300° C. The function of the system of the invention is to use the heat at 300° C from source 15 in order to raise a fluid (or other material) to higher temperatures on the order of 500° to 600° C. Attached to tank 10 and shown as forming one of the sides thereof is a separator 16 which is capable of separating $H_2$ from the other gases in the mixture in tank 10. Separator 16 may be a membrane type separator. In FIG. 1, numeral 17 designates a pipe or line through which $NH_3$ in equilibrium with $H_2$ and $N_2$, hereinafter referred to as the gas mixture is suppliable to tank 10. Valve 18 controls the flow of the gas mixture into tank 10.

For explanatory purposes, let it be assumed that the inlet valve 18 is closed and that the gas mixture in tank 10 is in equilibrium at 300° C at a given pressure. As $H_2$ is withdrawn through separator 16 into a hydrogen ($H_2$) tank 20 an imbalance in the equilibrium is created in the tank 10 due to the absence of the separated hydrogen. A higher concentration of $NH_3$ is present than is necessary for the proper equilibrium. As a result, additional heat is absorbed by the mixture to decompose some of the $NH_3$ to re-establish the proper equilibrium. The heat which is absorbed is known as the heat of decomposition which is for all practical purposes equal to the heat of recombination, which is the heat evolved when synthetic ammonia is produced by the direct reaction of $H_2$ and $N_2$. The heat of decomposition or recombination is on the order of 12,000 calories per gram mole of $NH_3$.

As more and more of the $H_2$ in tank 10 is separated from the rest of the mixture, more heat of decomposition is absorbed to decompose more of the $NH_3$. In FIG. 1, numeral 22 designates a tank to which the $N_2$ present in the tank is supplied. Theoretically, all of the $NH_3$ in the gas mixture in tank 10 can be decomposed and all the $H_2$ and $N_2$ in the original mixture, as well as those produced by the decompostion of the $NH_2$ can be stored in tanks 20 and 22, respectively. However, complete decomposition of all the $NH_3$ in tank 10 is not practical nor required. In practice, membrane-separator 16 permits only the flow of $H_2$ to tank 20 while the content of tank 22 is primairly $N_2$ and may contain some undecomposed $NH_3$ as well as small quantities of $H_2$. The presence of some $NH_3$ and $H_2$ in tank 22 is not detrimental to the operation of the system. It merely reduces to a small degree the efficiency of the system. For explanatory purposes, the presence of some $NH_3$ and some $H_2$ in tank 22 can be ignored and it may be assumed that it contains only $N_2$.

It should be stressed that the inlet valve 18 need not be closed. Gas mixture with $NH_3$ can be continually introduced into the tank 10 for a continuous mode of operation of the system. As long as $H_2$ is withdrawn into tank 20 an equilibrium imbalance will be created in tank 10 which will result in the absorption of heat of decomposition from source 15 of about 12,000 calories for each decomposed mole of $NH_3$. The process of the decomposition of the $NH_3$ is greatly enhanced by the presence of proper catalysts in tank 10, e.g., doubly promoted iron catalysts, which are well known by those familiar with the art. It should be appreciated that the 1/2 mole of $N_2$ and the 3/2 moles of $H_2$, separated from each decomposed mole of $NH_3$ store the 12,000 calories in the form of chemical potential.

In accordance with the present invention the tanks 20 and 22, containing $H_2$ and $N_2$, are connected to a reaction chamber 25, to supply $H_2$ and $N_2$ thereto. As is known, synthetic $NH_3$ is produceable by the direction reaction of $H_2$ and $N_2$. During the reaction the heat of recombination is released. This heat is capable of raising the temperature in chamber 25 to very high levels. For each mole of $NH_3$ that is formed by the recombination of $H_2$ and $N_2$, 12,000 calories are released. Assuming a specific heat for $NH_3$ of 8.9 cal/mole °C and further assuming that all of the heat of recombination is absorbed by the one mole of recombined $NH_3$, its temperature would increase by $12,000/8.9 = 1350°$ C. If the $H_2$ and $N_2$ entering chamber 25 is at 300° C, the $NH_3$ temperature would rise to about 1650° C. In practice, this is not the case. A substantial portion of the heat of recombination is absorbed by the physical mass of the chamber 25 and its content which always includes appropriate catalysts, such as doubly promoted iron catalysts which stimulate and enhance the recombination process, and by any ammonia which arrived undecomposed along with the nitrogen from tank 22.

In accordance with the present invention a heat exchanger 30 is associated with chamber 25. In FIG. 1 it is shown as a coiled pipe 32 which extends into the chamber 25. Fluid 35 is made to flow through the pipe 32 in order to absorb some of the heat evolved in the chamber 25 and thereby raise the temperature of the fluid exiting the chamber 25 to a level above the temperature of the fluid entering the chamber 25. For example, assume that the fluid 35 entering chamber 25 is saturated steam at 300° C. Its flow rate can be controlled by inlet valve 36 so that the fluid temperature reached in the chamber 25 is on the order of 550° C thereby raising the temperature of the steam exiting the chamber to about the same temperature, i.e., steam on the order of 550° C. The steam 35, exiting the chamber 25 may be supplied to any appropriate utilization device 38, e.g., an electrical generator turbine to thereby increase its efficiency and performance.

From FIGS. 2 and 3 it should be apparent that at 550° C the percentage of $NH_3$ at equilibrium is very low except at higher pressures. Thus, in practice the recombination of the $NH_3$ in chamber 25 should take place at high pressures to increase the amount of $NH_3$ which is produced for a given amount of $H_2$ and $N_2$ entering chamber 25. This can be achieved by initially storing the $H_2$ and $N_2$ in tanks 20 and 22 respectively at high pressure of several hundred atmospheres, e.g., 600 atmospheres so that the $NH_3$ recombination takes place at high pressure.

Figure 5:
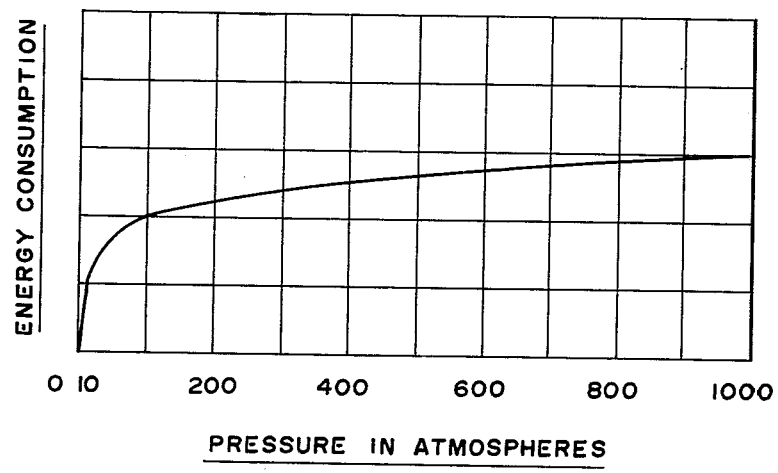
FIG. 5 is a diagram relating energy consumption to gas compression.
Figure 4:
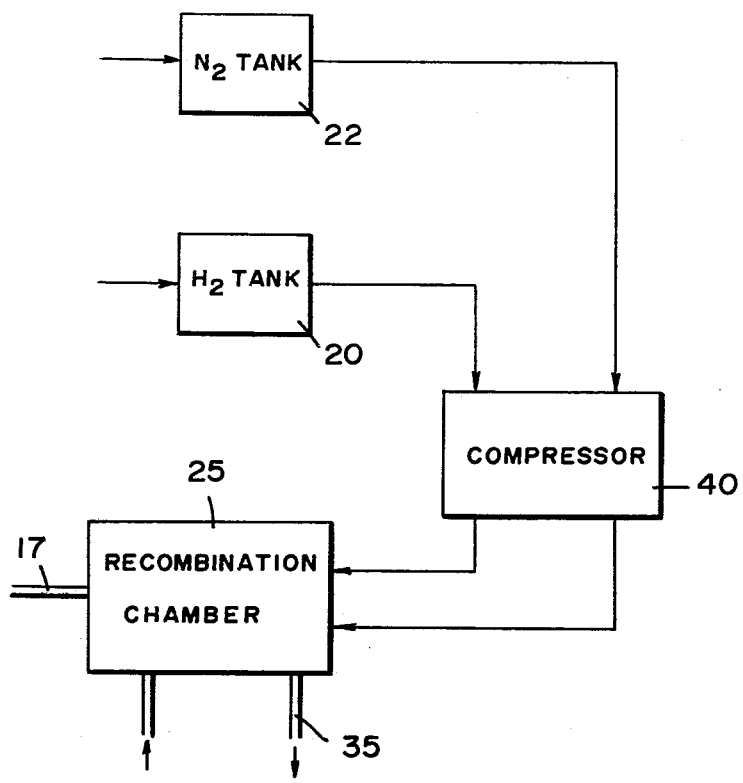
FIG. 4 is a partial diagram of another embodiment of the invention.

In addition it may be desirable to compress the $H_2$ and $N_2$ to higher pressures, than those present in their respective tanks before introducing them into chamber 25 so that the recombination of $NH_3$ would take place at even higher pressures. As shown in FIG. 4, a compressor 40 may be interposed between tanks 20 and 22 and the recombination chamber 25 to raise the pressure of the $H_2$ and $N_2$ entering the chamber 25, so that the recombination takes place at the most efficient pressure. For example, assuming that the pressure in each of tanks 20 and 22 is on the order of 600 atmospheres, compressor 40 may raise the $H_2$ and $N_2$ pressure entering chamber 25 to 1000 atmospheres or more to increase the percentage of ammonia which is formed in chamber 25 at a temperature of about 550° C. As is appreciated by those familiar with ammonia and as diagrammed in FIG. 5, the power required to compress ammonia-forming gases at several hundred atmospheres to higher pressures is relatively small. Thus, the amount of power needed to increase the pressure is small compared with the more efficient recombination of ammonia in the chamber 25, thereby increasing the system's efficiency.

The gas mixture including the recombined $NH_3$ at an assumed temperature of 550° C exits chamber 25 via conduit 17 for recirculation into the decomposition chamber 10. Thus, the system can be viewed as a closed loop system in which heat from a low temperature (300° C) source 15 is used to decompose $NH_3$ into its constituents $H_2$ and $N_2$, which are thereafter recombined to produce $NH_3$ in a recombination chamber in which the temperature is considerably higher, e.g., 550° C enabling fluid, e.g., steam to be heated up to the higher temperature.

Since the gas mixture exiting chamber 25 is assumed to be at 550° C which is higher than the operating temperature of 300° C in tank 10, the mixture can be cooled by passing conduit 17 through a heat exchanger 45 to extract heat from the mixture and lower its temperature from 550° C to 300° C. If desired, the inlet end of pipe 32 may form part of the heat exchanger 45 to use the heat extracted from the gas mixture in pipe 17 to first raise the fluid in pipe 32 to 300° C and thereafter feed it through the chamber for subsequent additional heating in chamber 25 to 550° C. In addition, if the pressure of the gas mixture exiting chamber 25 is higher than that in tank 10 the gas mixture pressure may be reduced to the required pressure in tank 10 by passing it through a power-producing turbine 47. The produced power may be used to supply at least part of the power required for compressor 40 as well as to regulate the pressures in the other tanks if required.

The process employed in the embodiment utilizing $NH_3$ as the working substance may thus be summarized as follows:

a. providing a source of heat at a relatively low temperature, e.g., 300° C, b. utilizing the heat to decompose $NH_3$ into its constituents, c. separating the constituents of the decomposed $NH_3$ d. producing synthetic $NH_3$ by the direct recombination of the separated constituents in a recombination chamber at a controlled higher temperature, e.g., 550° C, e. passing matter, e.g., a fluid through the chamber using, e.g., a heat exchanger, to raise the temperature of the fluid to the higher temperature in the reaction chamber.

The invention is not intended to be limited to one in which the working substance is $NH_3$, nor to the specific temperature and pressure values, hereinbefore used in explaining the invention. A source 15 providing temperatures at above or below 300° C may be used. However, at present sources on the order of 300° C are easily available. These include relatively inexpensive solar energy concentrators or geothermal energy sources, or heat produced in waste disposal processes. Also the final temperatures to which the fluid is raised in chamber 25 may also be above or below 550° C. The invention is intended to raise the temperature of the fluid by at least several hundred degrees C above the temperatures of the input thermal energy source 15.

The embodiment shown in FIG. 1, which as is appreciated is a closed loop system, operable in continuous mode rather than in a batch mode, can be used with working substances which are either gases which are decomposable into their gas constituents or a liquid which is decomposable into separable gas constituents. Several examples of such substances have hereinbefore been mentioned.

The present invention may also be used with a working substance which is a solid, such as metal hydride, which can be decomposed into a metal and $H_2$ and then recombined again under different conditions as represented by the following expression:

Metal-hydride⇌Metal + $H_2$

Figure 6:
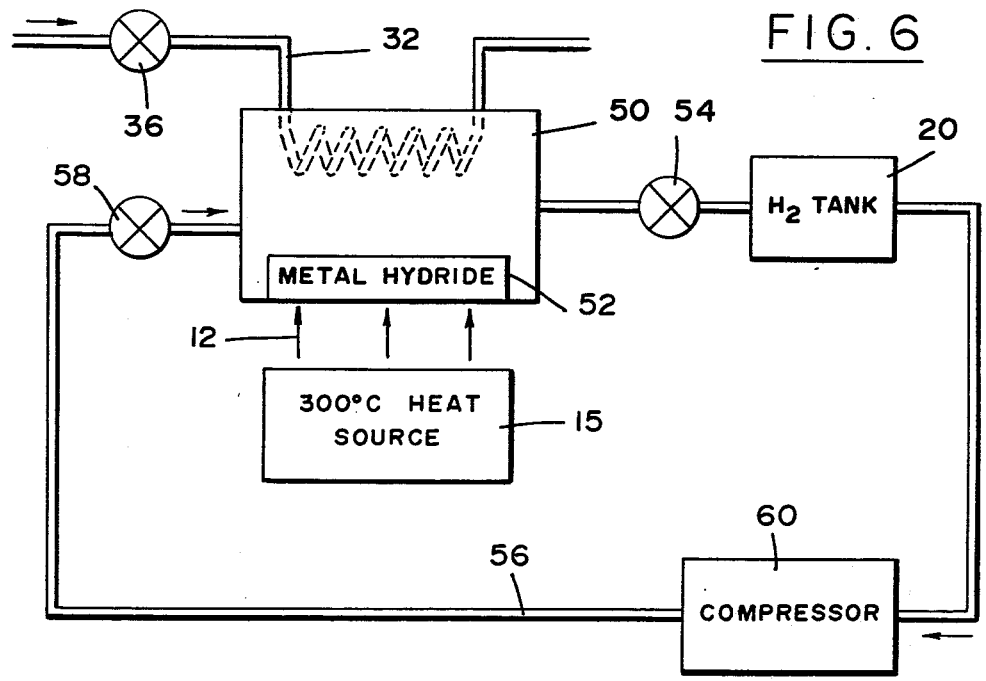
FIG. 6 is a diagram of an embodiment of the invention utilizing a metal-hydride as the working substance.

As is known, some metal hydrides can be decomposed into the metal and $H_2$ by absorbing heat from a low temperature source at low pressure. The decomposed constituents can be recombined at higher pressure into the original metal-hydride while releasing heat at higher temperatures which can be used to heat fluid to the higher temperatures. Such properties may be used in another embodiment of the invention which may best be described in connection with FIG. 6, wherein elements like those previously described are designated by like numerals. In FIG. 6, numeral 50 designates a decomposition-recombination tank or chamber in which a metal hydride 52 is contained. A $H_2$ tank is connected to chamber 50 by a pressure regulator flow control valve 54. Chamber 50, like chamber 10 hereinbefore described, is assumed to be heated to 300° C by heat from source 15. Coiled pipe 32 through which fluid 35 flows extends into the chamber 50. In addition, tank 20 is connected by conduit 56 to supply $H_2$ to the chamber 50 under the control of pressure regulator flow control valve 58.

Initially valve 58 is closed, inhibiting the flow of $H_2$ from tank 20 into the chamber 50. Valve 54 which is open controls the pressure in the chamber 50 so that at 300° C, the metal hydride 52 starts to decompose by absorbing heat of decomposition from source 15. As it decomposes $H_2$ is released while the metal remains in the chamber 50. The released $H_2$ is collected and held in tank 20. After total or partial decomposition, as the actual requirements may dictate, valve 54 is closed. Then valve 58 is opened and $H_2$ is fed back from tank 20 to chamber 50, at a higher pressure, provided by compressor 60. At the higher pressure the hydrogen entering chamber 50 recombines with the metal therein, to form again the metal-hydride. The recombination is accompanied by a significant increase in temperature which is used to heat the fluid 35 flowing through pipe 32.

As is appreciated, different metal-hydrides recombines under different temperature and pressure conditions. In the particular example, depending on the particular metal-hydride used, the flow of the fluid 35 in pipe 32 may be controlled by valve 36 and the pressure regulated by valve 58 and/or compressor 60 so as to cause the recombination to occur at a temperature significantly greater than the 300° C provided by source 15. Thus, the fluid can be heated to the higher temperature, e.g., 500° C or more.

For example, $MgH_2$ is decomposable into $Mg$ and $H_2$ at a temperature of 300° C and a pressure of about 1.5 atmospheres, while at a temperature of about 500° C it is recombinable at a pressure of about 100 atmospheres. Other metal-hydrides have different dissociation pressure-temperature properties. For example, palladium deuteride $PdD$ dissociates at 300° C at pressures on the order of 12 atmospheres or less, while at 500° C it can be recombined at pressures on the order of 300 atmospheres. The above stated temperatures and pressures are approximate, and are based on interpolation of values appearing in FIG. 4-2 in a book entitled "The Solid-State Chemistry of Binary Metal Hydrides" by G.G. Libowitz, published in 1965. In practice, the metal-hydride should be chosen based on the least amount of power needed for the pressure change in chamber 50.

It should be stressed that the embodiment shown in FIG. 6 is not merely one in which $H_2$ is extracted from a metal-hydride into which the $H_2$ can be restored. Rather, it is based on the decomposition of the metal-hydride at a low temperature (300° C) to separate the $H_2$ from the metal and thereafter recombine the $H_2$ with the metal to recreate the original metal hydride at a higher temperature and thereby heat a fluid to the higher temperature.

Although hereinbefore the invention has been described in connection with embodiments utilizing working substances which are gases or solids, it should be apparent that the basic principles of the invention may be employed in connection with a liquid working substance. In summary the invention is based on the utilization of thermal energy from a source of relatively low temperature to decompose a working substance into its constituents and separate the constituents. During the decomposition the heat of decomposition is stored as chemical potential in the separated constituents, then the separated constituents are recombined to produce the original working substance. The recombination process is accompanied by a significant rise in temperature which is used to raise the temeprature of a fluid to a significantly higher temperature level than that provided by the source used to provide the heat of decomposition at the lower temperature. A temperature increase on the order of several hundred degrees C or more is attainable with the various embodiments of the present invention.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for utilizing solar energy to produce superheated steam, the steps comprising:
   concentrating solar energy to heat a first chamber to a temperature on the order of 300° C;
   introducing into said first chamber a working substance which is gaseous and decomposes into first and second gaseous constituents at a temperature on the order of 300° C, whereby as said substance is heated to a temperature on the order of 300° C it decomposes into said two gaseous constituents;
   continuously separating and removing said first constituent from the other constituent and the undecomposed working substance in said first chamber to produce an imbalance in the equilibrium gaseous content in said chamber to thereby promote the continued decomposition of said substance in said first chamber;
   removing at least part of the second constituent from said first chamber;
   recombining the separated first and second constiuents which were removed from said first chamber in a second chamber to reform the working substance, the recombination being accomplished by the release of heat which raises the temperature in said second chamber to a temperature on the order of not less than 500° C; and
   passing through said second chamber steam which absorbs heat present in said second chamber and is heated thereby to a temperature on the order of not less than 500° C to form superheated steam, for use in turbine electrical energy generation.

2. A method as described in claim 1 wherein said first constituent is hydrogen and said second constituent is removed from said chamber with part of undecomposed working substance and wherein the first and second constituents are recombined in said second chamber with some undecomposed working substance present therein.

3. The method as described in claim 2 wherein said working substance is ammonia and said second constituent is nitrogen.

4. A method of utlizing geothermal energy to produce superheated steam, the steps comprising:
   introducing into a first chamber at a first selected pressure a gaseous working substance which decomposes into first and second gaseous constituents at a temperature on the order of 300° C at said first pressure;
   heating said first chamber with the working substance therein with geothermal energy to a temperature on the order of 300° C, whereby said working substance decomposes into said first and second constituents;
   continuously separating and removing said first constituent from the second constituent and the undecomposed substance in said first chamber to produce an imbalance in the equilibrium of the undecomposed substance and its constituents, present in said first chamber, to thereby facilitate the continued decomposition of said substance;
   removing from said first chamber at least part of the second constituent;
   recombining the first and second constituents, which were separated and removed from said first chamber, in a second chamber to reform the gaseous working substance at a second pressure, higher than said first pressure, the recombination being accomplished by the release of heat which raises the temperature in said second chamber to a temperature on the order of not less than 500° C; and
   passing through said second chamber steam which absorbs heat present in said second chamber and is thereby heated to a temperature on the order of not less than 500° C to form superheated steam, for use in generating electricity.

5. The method as described in claim 4 wherein said first constituent is hydrogen and said second constituent is removed from said chamber with part of undecomposed working substance and wherein the first and second constituents are recombined in said second chamber with some undecomposed working substances present therein.

6. The method as described in claim 5 wherein said working substance is ammonia and said second constituent is nitrogen.

* * * * *